April 12, 1932.  E. H. SCHMIDT  1,853,886
FRICTION DRAFT GEAR
Filed Aug. 4, 1927    2 Sheets-Sheet 1
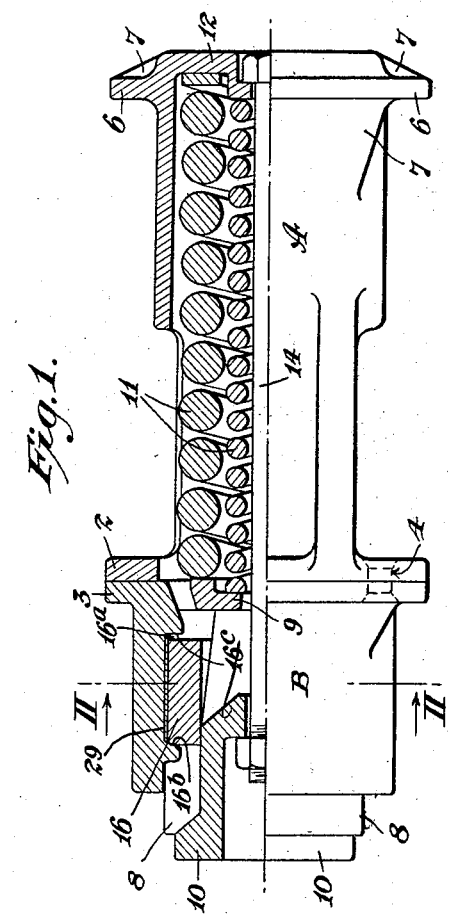
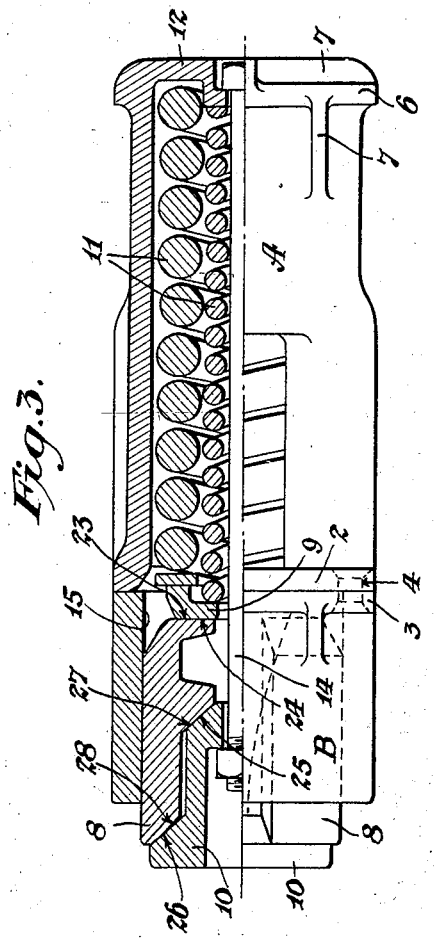
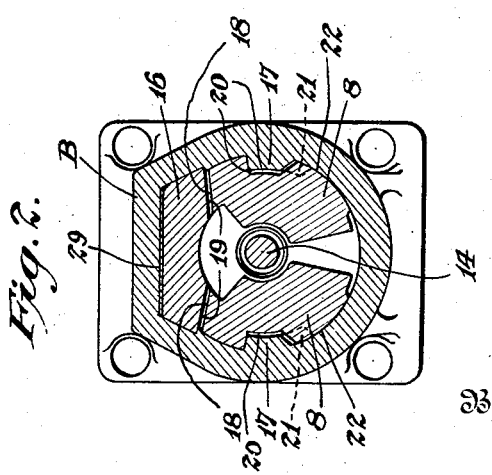
Inventor
Ernest H. Schmidt
By his Attorney
Clarence D. Kerr

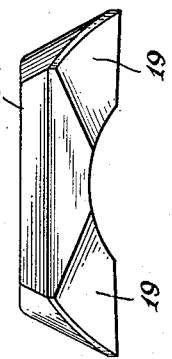
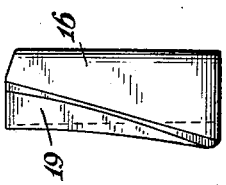
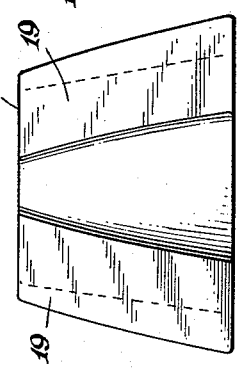
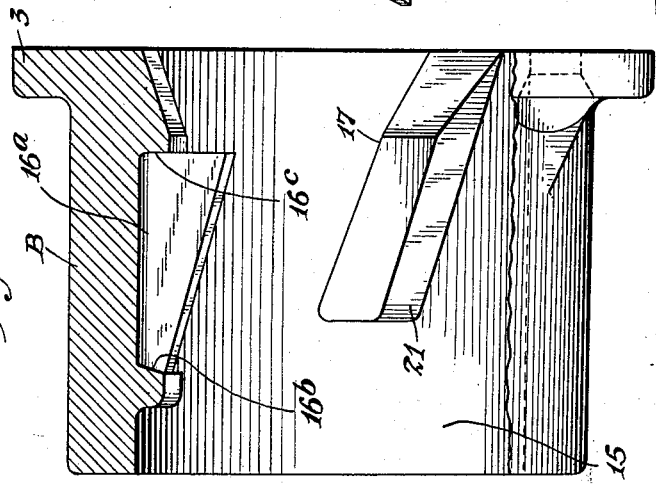
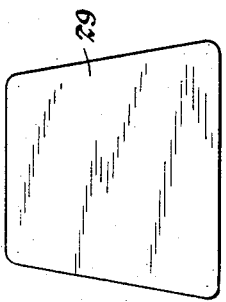
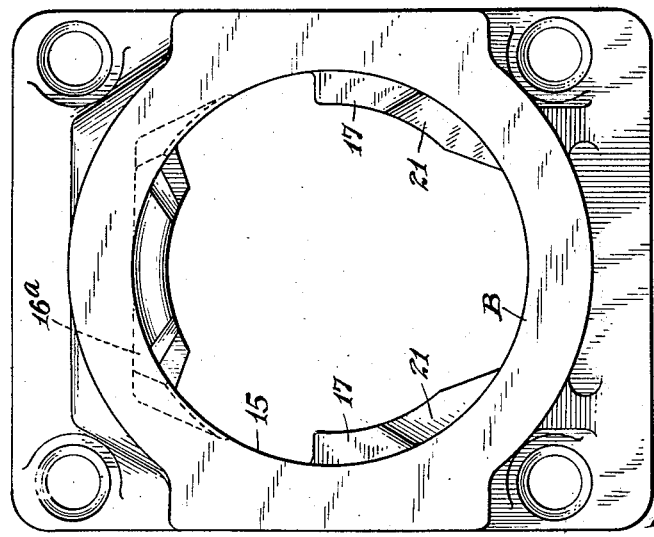
Inventor
*Ernest H. Schmidt*
By his Attorney
*Clarence Kerr*

Patented Apr. 12, 1932

1,853,886

UNITED STATES PATENT OFFICE

ERNEST H. SCHMIDT, OF CLEVELAND HEIGHTS, OHIO, ASSIGNOR TO NATIONAL MALLEABLE & STEEL CASTINGS COMPANY, OF CLEVELAND, OHIO, A CORPORATION OF OHIO

FRICTION DRAFT GEAR

Application filed August 4, 1927. Serial No. 210,505.

My invention relates to friction draft gear and is directed particularly to improvements in the type of friction draft gear described and claimed in my application Serial No. 124,560, filed July 24, 1926, in which a friction shell is engaged by a plurality of friction shoes and the shoes are caused to rotate within the shell during compression or release and thus develop a high frictional capacity and distribute the stresses and wear more uniformly within the friction casing.

In my improved construction I have provided effective means for ensuring the release of the frictional parts after compression, and also improved means for causing the rotation of the frictional shoes in the case. My invention also comprises various features which I shall hereinafter describe and claim.

In the drawings, Fig. 1 is a plan, half in section, of a friction draft gear embodying my invention; Fig. 2 is a section on lines II—II of Fig. 1; Fig. 3 is a side elevation, half in section; Fig. 4 is a front elevation of the friction shell; Fig. 5 is a side elevation of the friction shell partly in section; Fig. 6 is a perspective of the compression member; Fig. 7 is a bottom plan view thereof; Fig. 8 is a side elevation thereof; Fig. 9 is a plan of an anti-friction pad, and Fig. 10 is a side elevation thereof.

Referring more specifically to the drawings, A indicates a spring case or shell having at its forward end outwardly extending flanges 2 which are engaged by corresponding flanges 3 on the friction case or shell B. The flanges 2 and 3 are held together by rivets 4, as is indicated in Fig. 1. At its rear end the case A is provided with wings 6 suitably reinforced with ribs 7 merging into the sides of the case A.

Within the friction chamber B are friction shoes 8 interposed between the spring seat 9 and the friction wedge 10. The spring case A carries one or more draft springs 11 which bear at one end against the spring seat 9 and at the other end against the base 12 of the case A. The parts are held in assembled relation by the retaining rod 14, which has a bearing on the wedge 10 and base 12.

The inside face 15 of the friction case B may, if desired, be tapered inwardly toward its rear end. It is provided with a compression lug 16 formed in a separate piece, which is seated in a recess 16$^a$ on the inner surface 15 of the friction case and is permitted to have a limited longitudinal movement in such recess between the shoulders 16$^b$ and 16$^c$.

The case B has also a pair of release lugs 17, preferably made as a part of the friction case B. Co-operating with the inside face 15 of the case and the lugs 16 and 17 are the friction shoes 8, each of which is formed with a spirally shaped face 18 to co-operate with a spiral face 19 on the lug 16 and with a groove 20 to cooperate with the spiral face 21 on one of the release lugs 17. The outer circumferential surface 22 of a shoe 8 has a frictional bearing against the inner surface 15 of the friction shell B, while the rear surface 23 of a shoe bears against the forward face 24 of the spring seat 9, as is shown in Fig. 3. The face 24 may be conical or any suitable shape. The shoes are further provided with wedging surfaces 25 and 26 which engage the correspondingly inclined wedging surfaces 27 and 28 of the friction wedge 10.

If desired an antifriction pad 29 may be inserted between the compression lug 16 and the friction case. Also, the use of thicker pads causes the shoes to contact with the spirals 19 sooner, and thus causes the frictional resistance to build up more rapidly.

The operation of my improved gear is as follows: When the gear is being compressed, the friction wedge is forced rearwardly with respect to the friction shell B, and this in turn moves the shoes rearwardly against the action of the springs 11 and against the friction between the surfaces 22 of the shoes and the inner face 15 of the shell B. As the shoes move rearwardly, they come into engagement with the lug 16 and force it rearwardly until the clearance between its rear face and the shoulder 16$^c$ has been taken up. Further rearward movement of the shoes will cause them to rotate in opposite directions by reason of the engagement of their spiral faces 18 upon the spiral faces 19 of the compression lug. This causes an additional frictional engagement between the lug 16 and the faces 18 of the shoes. The rotation of the shoes also causes additional frictional resistance to build upon the engaged surfaces of the friction shell, wedge 10 and spring seat 9. It will further be seen that the rotation of the shoes in opposite directions serves to equalize the torsional forces and eliminates any tendency of the gear to rotate as a unit.

As the pressure abates the springs with the guidance furnished by the lugs 17 normally restore the wedge and shoes to initial position. Where, however, as sometimes happens, the shoes have become frozen on, or stuck upon, the spiral faces 19 of the lug 16, the releasing action will be as follows: Under the pressure of the compressed springs 11, the spring seat 9, shoes 8, lug 16, and wedge 10 are forced outwardly as a unit until the clearance between the lug 16 and the shoulder 16$^b$ has been taken up. During this momentary interval and by this short movement the adhesion of the shoes to the case is broken but that between the shoes and the surfaces of the lug is not. The impact of the lug 16 against the shoulder 16$^b$ is sufficient to cause the shoes, which are being urged forward by the combined effort of the springs, to break away from the lug 16 and thereafter the release is completed in the normal manner. It will thus be seen that by my improved structure I am enabled to break the adhesion of the shoes successively from two sets of friction surfaces and thus insure an effective releasing action in the gear.

Not only does making the compression lug 16 in a separate piece facilitate the manufacture of the friction case because of the elimination of this peculiarly shaped piece, which is difficult to cast with accuracy, but also because it enables using a more durable material, such as a drop forging, for the compression lug.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the inventions claimed. Matter disclosed but not claimed herein is claimed in my application Serial No. 124,560 hereinbefore referred to.

What I claim is:

1. In a friction draft gear, a frictional shell; friction shoes disposed in said shell in frictional engagement therewith, means for actuating said shoes, yieldable means arranged to oppose movement of said shoes in one direction, and a member movable relative to the shell and the shoes, said member during a part of the compression stroke of the gear being arranged to be held immovable with respect to the shell and to rotate the shoes in opposite directions about the longitudinal axis of the shell.

2. A friction shock absorbing mechanism comprising a friction shell; friction shoes; a compression spring arranged to oppose movement of said shoes in one direction; a wedge having a conical wedging surface for engagement with the friction shoes to maintain them in frictional engagement with the shell; and means within said shell for causing the shoes in compression to rotate about the longitudinal axis of the shell, said means having a limited movement relative to said shell.

3. In a friction draft gear, a friction member, shoes disposed in said member for frictional engagement therewith, means for actuating said shoes, a yieldable element arranged to oppose movement of the shoes in one direction, and a member in said friction member and movable relative thereto through extents limited by fixed stops, for spirally rotating said shoes; said shoes, as the pressure abates, being capable of limited movement with said member relative to said friction member, said limited movement of travel of said shoes with said friction member being less than the total extent of travel of the shoes with respect to said casing.

4. In a friction draft gear, a friction member, friction shoes disposed in said member, a wedge adapted to force said shoes into frictional engagement with said friction member, yieldable means arranged to oppose the movement of the shoes in one direction, and means on the inner surface of said friction member capable of a limited movement relative thereto for rotating the shoes in opposite directions about the longitudinal axis of said member during compression of the draft gear.

5. In a friction draft gear, a friction shell, shoes disposed in said shell in frictional engagement therewith, means for actuating said shoes, yieldable means arranged to oppose movement of said shoes in one direction, a member within said shell, anti-friction means between said member and said shell, said member being movable relative to said shell and said shoes, and being adapted to cause the shoes when under pressure to rotate in frictional engagement with said member and said shell.

6. In a friction draft gear, a friction shell, a member in said shell movable relative thereto, friction shoes disposed in said shell arranged to be rotated in frictional engagement with said shell and said member, yieldable means arranged to oppose movement of the shoes in one direction, limiting stops in said shell; said member, as the pressure abates, being capable of a limited longitudinal movement with the shoes within the limits of said stops to break the adhesion of the shoes to the shell before the adhesion of the shoes to said member is broken.

7. A friction shock absorbing mechanism comprising a longitudinally extending friction member, friction shoes, a compression spring arranged to oppose movement of said shoes in one direction, a wedge engaging the shoes to maintain them in frictional engagement with the friction member, and a compression member for engagement with the friction shoes and effecting a change in the direction of their movement and capable of adjustment with respect to the friction member whereby the point at which the change in the direction of movement takes place can be regulated.

ERNEST H. SCHMIDT.